United States Patent Office 3,505,297
Patented Apr. 7, 1970

3,505,297
ALKENYL HETEROCYCLES AND
THEIR POLYMERS
David P. Sheetz and Edwin C. Steiner, Midland, Mich.,
assignors to The Dow Chemical Company, Midland,
Mich., a corporation of Delaware
No Drawing. Filed Jan. 21, 1963, Ser. No. 252,616
Int. Cl. C07d 85/00, 87/00; C08f 19/00
U.S. Cl. 260—78.4                         11 Claims

ABSTRACT OF THE DISCLOSURE 2-alkenyloxazines and 2-alkenyloxazolines are prepared in good yield by reacting one mole of an imidoester, preferably in the hydrochloride or hydrobromide form, with two to four molar equivalents of a strong base to effect both a double dehydrohalogenation and a ring closure of the imidoester. The resulting products are polymerizable with free radical catalysts to form homopolymers or copolymers with monomers free of acidic substituents. The polymers may be crosslinked by reaction with a polycarboxylic acid or a Lewis acid; the Lewis acid may be added in the form of a salt of a volatile nitrogenous base which is unreactive until heated, thus providing stable curable compositions.

---

This invention relates to a new process for making 2-alkenyloxazines and 2-alkenyloxazolines and it relates particularly to a new method for separating and purifying these compounds. The invention also relates to a novel class of 2-alkenyloxazolines, to advantageous polymers obtainable therefrom, and to methods whereby these new polymers are prepared.

Alkenyloxazines and alkenyloxazolines as a general class have been prepared in the past by several methods, including the reaction of certain alkanolamines with acrylic esters and the reaction of trimethylene diols or the corresponding trimethylene oxides with acrylonitriles. These known methods have a number of limitations and disadvantages, for example, expensive or unusual reagents, low yields and impure products because of side reactions, and the like. It is a principal object of this invention to provide a widely applicable and relatively inexpensive process to make compounds of this broad class which are useful as monomers and as chemical intermediates. A more specific object is to make these compounds available in good yield and in high purity.

The compounds preparable by this new process have the formula

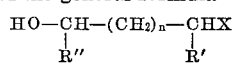

wherein R is hydrogen or methyl, R' and R'' are hydrogen or primary or secondary alkyl of one to about 16 carbon atoms, and $n$ is zero or one. It has been found that these compounds are made in good yield by reacting one mole of an imidoester having the structure

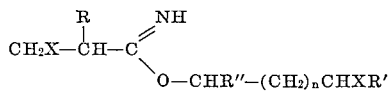

R, R', R'', and $n$ being as defined above and X representing chlorine or bromine, with about two to about four molar equivalents of a strong base at about 0–100° C. The imidoester, preferably employed as its hydrochloride or hydrobromide, is prepared in good yield by the reaction of acrylonitrile or methacrylonitrile with about one mole of a halohydrin of the general formula

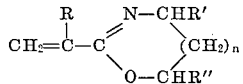

R', R'', X, and $n$ being as defined above, and from two to about four moles of hydrogen chloride or hydrogen bromide at a temperature near or below ordinary room temperature, preferably at 0–25° C. The reaction is run under essentially anhydrous conditions to avoid hydrolysis of the product and is most advantageously carried out in inert solvent solution. Instead of the unsaturated nitrile, the corresponding 3-halopropionitrile may be used in the same molar proportion with a commensurate reduction in the quantity of hydrogen halide required.

The entire process as ordinarily run, therefore, consists of two main steps, the first being the preparation of the imidoester hydrohalide by the method shown, commonly known as the Pinner reaction, and the second being the reaction of the imidoester with a base to effect a double dehydrohalogenation and a ring closure.

A relatively strong base is required for this last step. Alkali metal hydroxides and carbonates such as sodium hydroxide and potassium carbonate can also be used. Strong organic bases which are soluble in organic solvents are preferred. Lower alkyl tertiary amines, where the alkyl groups contain from one to about four carbon atoms, are suitable as well as heterocycloaliphatic tertiary amines such as N-alkylpiperidines and N,N'-dialkylpiperazines. Triethylamine has been found satisfactory and other tri-(lower alkyl)-amines, for example, N-propyldiethylamine, N-methyldipropylamine, N-butyldimethylamine, and similar compounds are equivalent for the purpose. From two to about four moles of such a base per mole of imidoester is required and about 2.3 to about 2.7 moles is preferred. Where the hydrohalide of the imidoester is employed, an additional molar equivalent of base is needed per mole of ester hydrohalide.

The imidoester-base reaction, while theoretically operable in the absence of a solvent, is preferably carried out in about 0.5–1.5 liters of an inert solvent per gram mole of imidoester. Larger quantities of solvent can be used but no advantage is gained and separation of the reaction product is unnecessarily complicated. By an inert solvent is meant a solvent or mixture of solvents which will dissolve at least a part of both reactants and will not react with them or the reaction product to an extent such that the process becomes practically inoperable. For example, if an alkali metal compound such as sodium carbonate is used as the base, the reaction is sometimes best carried out in an organic solvent containing a small amount of water to dissolve at least a part of the sodium carbonate. The presence of this water causes hydrolytic side reactions, thereby reducing the yield of the desired product, and only fair yields are obtainable. Preferably, the reaction is run in an inert organic solvent under substantially anhydrous conditions to prevent such loss. Organic solvents suitable for use in the reaction include substituted hydrocarbons which are essentially unreactive in the process such as methylene chloride, chloroform, carbon tetrachloride, ethylene dichloride, perchloroethylene, chlorobenzene, fluorinated hydrocarbons, and nitrobenzene; hydrocarbons such as hexane, cyclohexane, benzene, toluene, and the like; and ethers such as diethyl ether, anisole, and tetrahydrofuran. Solvents of relatively high polarity have been found to give best results. Methylene chloride is a preferred solvent.

The reaction of the imidoester, usually as its hydrochloride, with the base may be run at a temperature within the approximate range of 0–100° C. Preferably, the reaction, which is exothermic, is started at a relatively low temperature, about 0–25° C., and the mixture is thereafter maintained at a higher temperature until the reaction is substantially completed. This higher temperature is conveniently the reflux temperature of the reaction mixture. Under these conditions, a reaction time is normally about 0.1–15 hours, the optimum length of reaction time depending upon the type of product being made and the temperature at which the reaction is carried out. When operating at atmospheric pressure, the reaction is conveniently carried out at about 30–60° C., a reaction time of approximately 2–8 hours being required under these conditions.

The product can be obtained from the reaction mixture by any of various conventional separation procedures for handling similar mixtures. In general, the final separation and purification of the alkenyl oxazoline or oxazine product is best accomplished by fractional distillation. The halide salt produced in the reaction may first be separated by filtration or by aqueous extraction of the mixture or, preferably, where the base used is an amine, the amine salt may be converted to the free base by contacting the reaction mixture with aqueous sodium or potassium hydroxide solution. The organic layer obtained is then distilled to recover the reaction solvent and the amine which may be recycled to the process and the distillation is continued to obtain the desired reaction product. It is desirable to add a small amount of a polymerization inhibitor, such as phenothiazine, hydroquinone, or N,N'-diphenyl-p-phenylenediamine to the reaction mixture prior to distillation. However, such conventional inhibitors alone are sometimes ineffective in preventing sudden polymerization in the course of the distillation triggered by small amounts of hydrogen halide, thereby radically reducing the yield of product obtained. In larger scale operation, particularly, this causes trouble because of the extreme difficulty of removing all traces of triethylamine hydrohalide or incompletely dehydrohalogenated intermediate prior to distillation. Optionally, therefore, incorporation in the mixture of a small amount of an otherwise inert acid acceptor which will remain active within the residue throughout the course of the distillation guards against such loss of product and helps to insure the high yields which constitute a primary advantage of this process. Acid acceptors suitable for this purpose include alkyl tertiary amines having a boiling point higher than the product being distilled, for example, tributylamine, triamylamine, trioctylamine, higher N-alkylpiperidines, and the like.

Modifications of the process are illustrated by the examples which follow. Other changes in operation within the broad description of the process may be made according to particular circumstances involved.

EXAMPLE 1

A solution of 265 g. of acrylonitrile and 402 g. of ethylene chlorohydrin in 450 g. of anhydrous ethyl ether was cooled below 10° C. and 658 g. of anhydrous HCl was added at about 5–10° C. over a period of five hours. The reaction mixture was maintained at this temperature overnight and the 2-chloroethyl 3-chloropropionimidate hydrochloride which had precipitated as fine white crystals was separated by filtration, washed with ether, and vacuum dried at 30° C. A 97% yield of 98% pure product was obtained, based on the starting materials.

A mixture of 310 g. of this product and 2 g. of phenothiazine to inhibit polymerization was dissolved in 1500 ml. of methylene chloride and the resulting solution was cooled to about 5° C. To the cold solution there was added 505 g. of triethylamine with good stirring, causing the reaction mixture to warm up to reflux temperature. Refluxing was continued for about four hours and the reaction mixture was then allowed to stand at room temperature overnight. Triethylamine hydrochloride was removed by washing the reaction mixture with about a liter of water. The organic layer was separated and distilled successively at atmospheric pressure to remove methylene chloride, at 120 mm. Hg absolute to remove excess triethylamine, and finally at 35 mm. Hg absolute to isolate the oxazoline product. Essentially pure 2-vinyl-2-oxazoline was obtained in 84% yield based on the starting imidoester hydrochloride. The product was a colorless liquid with pyridine-like odor, boiling point 51–52° C./35 mm. Hg.

EXAMPLE 2

A reaction flask was charged with 2.0 g. mole quantities of methacrylonitrile and ethylene chlorohydrin and 200 cc. of methylene chloride. The solution was cooled to 3° C. and dry HCl was bubbled in at as fast a rate as was consistent with maintaining the temperature of the solution at 3–13° C. After about 5.6 g. moles of HCl had been added in about 5 hours, the rate of HCl absorption decreased markedly and the addition was stopped. The reaction mixture was kept at about 5° C. overnight to allow the reaction to go to completion. About 2 liters of methylene chloride was added and the solution was refluxed at 25° C./500 mm. for 2 hours to remove excess HCl. As the HCl was removed, 2-chloroethyl-3-chloro-2-methylpropionimidate hydrochloride precipitated as small flat crystals. The slurry was then cooled to 50° C. and 7.0 g. moles of triethylamine was added with vigorous stirring, whereupon the temperature of the reaction mixture rose in about one hour to reflux temperature. Heat was supplied to maintain refluxing for 5 hours at which time reaction was complete as determined by infrared analysis. Triethylamine hydrochloride was separated by filtration of the cooled reaction mixture and the filtrate was fractionally distilled as in Example 1 after addition of 2 g. of phenothiazine. No acid acceptor such as tributylamine was added and considerable product was lost as polymeric pot residue. A 33% yield of 2-isopropenyl-2-oxazoline was obtained, based on the starting nitrile and chlorohydrin. The product was a colorless liquid of characteristic odor, boiling point 63–64° C./35 mm.

EXAMPLE 3

In the manner described in Example 2, 0.4 g. mole quantities of 1-chloro-2-dodecanol and acrylonitrile were reacted in methylene chloride solution to make the 1-(chloromethyl)undecyl 3-chloropropionimidate hydrochloride which was then further reacted with excess triethylamine to make 5-decyl-2-vinyl-2-oxazoline. The final reaction mixture was flash distilled to remove methylene chloride and excess triethylamine. The product was then distilled at 12 microns Hg absolute pressure to obtain a 45% yield of the oxazoline based on the starting chlorohydrin and nitrile. The product was a colorless liquid, boiling point 50–58° C./0.012 mm. Hg. It assayed about 90% purity by amine titration.

EXAMPLE 4

Following the procedure of Example 2, equal molar quantities of 3-chloro-1-propanol and acrylonitrile were reacted with excess HCl to make the imidoester hydrochloride which was further reacted with excess triethylamine to make the oxazine. The product was redistilled to obtain 5,6-dihydro-2-vinyl-4H-1,3-oxazine, 98% pure by amine titration. It was a colorless liquid with a boiling point of 60–61° C./20 mm.

The results of these and other similar syntheses are summarized in Table I. The identities of all the products were confirmed by elemental analysis and infrared spectroscopic examination and in some cases also by vapor phase chromatography. Purities were checked by amine titration. Vinyl-substituted oxazolines and oxazines were obtained by reacting acrylonitrile with a chlorohydrin, isopropenyl-substituted compounds were obtained by using methacrylonitrile as the nitrile reactant.

erization of these compounds with monomers having acid substituents such as —COOH, —SO₃H, —COCl, and acid

TABLE I

| Product | Chlorohydrin | Percent yield | Boiling point, °C./mm. | Refractive Index $n_D$ (° C.) |
|---|---|---|---|---|
| 2-vinyl-2-oxazoline | 2-chloroethanol | 84 | 51–2/35 | 1.478 (22) |
| 2-isopropenyl-2-oxazoline | do | 33 | 63–4/35 | 1.4715 (22) |
| 5-decyl-2-vinyl-2-oxazoline | 1-chloro-2-dodecanol | 45 | 50–8/0.012 | 1.4658 (25) |
| 2-isopropenyl-4,5-dimethyl-2-oxazoline | 3-chloro-2-butanol | 43 | 59–60/20 | 1.4525 (25) |
| 4,5-dimethyl-2-vinyl-2-oxazoline | do | 50 | 49–52/25 | 1.4505 (25) |
| 4-methyl-2-vinyl-2-oxazoline | 2-chloro-1-propanol | 59 | 54–6/35 | 1.4648 (25) |
| 5-methyl-2-vinyl-2-oxazoline | 1-chloro-2-propanol | 83 | 57/35 | 1.4629 (25) |
| 5,6-dihydro-2-isopropenyl-4H-1,3-oxazine | 3-chloro-1-propanol | 70 | 71.5/20 | 1.4798 (25) |
| 5,6-dihydro-2-vinyl-4H-1,3-oxazine | do | 33 | 60–1/20 | 1.4840 (25) |

The alkenyl oxazolines and oxazines described herein are useful monomers which can be homopolymerized and copolymerized by conventional methods of addition polymerization using free-radical initiating catalysts such as di-tert-butyl peroxide, hydrogen peroxide, and azobisisobutyronitrile. Homopolymers thereby prepared are thermoplastic resins somewhat soluble in water and soluble in organic solvents such as acetone, methonal, and benzene. Hard, clear films can be cast from the solutions. Their solubility in water makes these resins useful as soil antiredeposition agents effective in combination with anionic surface active materials. They are also useful in the treatment of paper and textile fibers to add crease resistance and other valuable properties. These monomers can also be copolymerized with other ethylenically unsaturated monomers such as acrylate and methacrylate esters, acrylonitrile, acrylamide, styrene, butadiene, and similar non-acidic polymerizable monomers to produce resins of high molecular weight capable of being formed into various useful shapes by compression or injection molding techniques. Films can be cast from solutions of these copolymers which are capable of being deposited as protective coatings. Fibers can be drawn from the molten resins. The properties of both homo- and copolymers can be modified by the incorporation of conventional additives such as fillers, pigments, plasticizers, lubricants, and the like.

These monomers are also useful as chemical intermediates for the preparation of other unsaturated compounds which are themselves useful polymerizable monomers. Alkenyl oxazolines and oxazines can be hydrolyzed under moderate conditions, opening the ring structure to give acrylates or acrylamides, depending upon the conditions. When the hydrolysis is carried out the presence of acid, 2-aminoethyl or 3-aminopropyl acrylates and methacrylates are obtained from oxazolines and dihydrooxazines respectively. From neutral or basic hydrolyses are obtained the corresponding N-(hydroxyalkyl)acrylamides and methacrylamides.

Particularly useful among the above-described compounds is a specific class of alkenyloxazolines of the formula

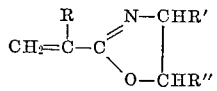

wherein R, R′ and R″ are as previously defined but with the distinction that at least one of R′ and R″ is hydrogen. It has been found that these compounds, which constitute a new and hitherto unrecognized class are valuable monomers which can be polymerized or copolymized with non-acidic, i.e., neutral or basic ethylenically unsaturated polymerizable monomers. Because the oxazoline ring structure in these new monomers is susceptible to acid attack, attempted copolymerization of these compounds with monomers having acid substituents such as —COOH, —SO₃H, —COCl, and acid anhydride produces unusable mixtures of decomposition products and other byproducts rather than the desired copolymers. Therefore, the monomers which can be copolymerized with these new compounds are defined as the known ethylenically unsaturated polymerizable monomers which are non-acidic, i.e., neutral or basic in that they do not have acid substituents such as described above. Suitable basic and neutral ethylenically unsaturated polymerizable monomers include the non-acidic alkenylaromatic compounds, the esters, salts, nitriles, and amides of ethylenically unsaturated acids, esters of unsaturated alcohols, unsaturated ethers, unsaturated ketones, ethylenically unsaturated aliphatic hydrocarbons, and other neutral or basic compounds containing one or more ethylenic linkages capable of addition polymerization. Specific examples of such non-acidic ethylenically unsaturated compounds are styrene, α-methylstyrene, ar-methylstyrene, ar-ethylstyrene, α,ar-dimethylstyrene, ar,ar-dimethylstyrene, divinylbenzene, vinylnaphthalene, divinylnaphthalene, hydroxystyrene, methoxystyrene, aminostyrene, cyanostyrene, acetylstyrene, monochlorostyrene, dichlorostyrene, other halostyrenes, vinylpyridine, salts of acrylic and methacrylic acids, methyl methacrylate, ethylacrylate, glycol diacrylate, hexyl acrylate, lauryl methacrylate, phenyl acrylate, allyl acrylate, acrylonitrile, methacrylonitrile, acrylamide, methacrylamide, acrylanilide, ethyl α-chloroacrylate, diethyl maleate, diallyl fumarate, vinyl acetate, vinyl propionate, vinyl butyrate, vinyl benzoate, vinyl chloride, vinyl bromide, vinylidene chloride, vinylidene bromide, vinyl methyl ketone, methyl isopropenyl ketone, vinyl carbazole, vinyl ethyl ether, divinyl ether, isobutylene, 1,3-butadiene, isoprene, and the like.

Polymers having advantageous properties not possessed by the polymers of other alkenyloxazolines are thereby obtained. Polymers made from these new monomers have the distinguishing characteristics of being easily and effectively crosslinked by various procedures to yield hard, infusible, and insoluble resins which are highly resistant to both water and organic solvents. For reasons as yet not wholly explained, polymers of alkenyloxazolines having plural alkyl ring substituents are not significantly crosslinked under the same conditions and these polymers remain thermoplastic and subject to attack by solvents.

EXAMPLE 5

A solution of 1 part by weight of 2-vinyl-2-oxazoline, 4 parts of styrene, and 0.01 part of azobisisobutyronitrile in 10 parts of toluene was heated for 41 hours at 60° C. under nitrogen. There was obtained a viscous solution containing 19% non-volatile solids, representing a 38% conversion by weight of the total monomers to polymer. The polymer was precipitated by addition of methanol, filtered, and dried. Analysis of this solid showed that it contained 18.8% by weight of polymerically combined 2-vinyl-2-oxazoline. Solutions of the polymer in toluene deposited a clear hard film when cast on a glass plate and dried.

EXAMPLES 6–9

The polymerization of Example 5 was repeated using the same weight of an acrylate ester in place of the styrene. The results are listed in the following table:

| Comonomer | Percent conversion to polymer | Percent VO in polymer |
|---|---|---|
| Butyl acrylate | 80 | 24.4 |
| Methyl methacrylate | 88 | 17.3 |
| Lauryl methacrylate | 74 | 16.6 |
| Stearyl methacrylate | 86 | 20.3 |

The copolymers obtained had properties similar to those of the product of Example 5.

EXAMPLE 10

A solution of 10 parts by weight of 2-vinyl-2-oxazoline and 0.01 part of azobisisobutyronitrile in 10 parts of benzene was blanketed with nitrogen and heated for 5.5 hours at 70° C. There was obtained a clear, viscous solution containing 40% of non-volatile solids. Films prepared by casting this solution on a glass plate and allowing the volatile ingredients to evaporate were hard and clear. Addition of hexane to the benzene solution precipitated the polymer in the form of a white fusible solid.

EXAMPLE 11

A solution of 3.1 parts by weight of 2-vinyl-2-oxazoline 20 parts of acrylamide, 0.16 parts of potassium carbonate, 0.2 part of thiourea, and 0.33 part of hydrogen peroxide in 65 parts of water was blanketed with nitrogen. Polymerization occurred spontaneously over about 30 minutes to yield a clear viscous solution. Upon removal of water from this solution, a hard, fusible solid was obtained.

Examples 12–17 illustrate the preparation of copolymers of these new oxazolines and similar copolymers of related oxazolines for purposes of later comparison.

EXAMPLES 12–17

Copolymerizations were carried out by heating at 70° C. for 21–37 hours solutions containing 3 parts by weight of methyl methacrylate and one part of an oxazoline in 33% benzene solution in the presence of a small amount of azobisisobutyronitrile (ABIN) and under a nitrogen blanket. The polymers obtained were isolated by precipitation and washing wtih hexane. Results obtained are shown in the following table:

| Oxazoline Monomer | Percent ABIN | Polymer time, hrs. | Percent conversion to polymer | Percent oxazoline in polymer |
|---|---|---|---|---|
| (A) 2-vinyl-2-oxazoline | 0.2 | 21 | 99.6 | 22.2 |
| (B) 5-methyl-2-vinyl-2-oxazoline | 0.2 | 24 | 90.6 | 23.4 |
| (C) 4-methyl-2-vinyl-2-oxazoline | 0.2 | 24 | 88.7 | 23.0 |
| (D) 2-isopropenyl-2-oxazoline | 0.4 | 37 | 76.9 | 26.4 |
| (E) 2-isopropenyl-4,4-dimethyl-2-oxazoline | 0.4 | 37 | 82.5 | 27.3 |
| (F) 4,5-dimethyl-2-vinyl-2-oxazoline | 0.2 | 24 | 87.9 | 24.1 |

The polymers obtained as shown above were white fusible solids whose solutions cast hard, clear films when dried on glass plates.

An effective method for crosslinking polymers of the new alkenyloxazolines previously described comprises contacting these polymers with a strong Lewis acid. Preferably, the composition is then heated at 100°–200° C. to cause the crosslinking reaction to take place with comparative rapidity. Crosslinking also occurs at lower temperatures but at a much slower rate.

Lewis acids such as boron trifluoride, nitric acid, perchloric acid, and organic sulfonic acids and their esters such as toluenesulfonic acid, methyl benzenesulfonate, and 1-ethyl-2-sulfoethyl methacrylate are effective in the process. These are used in 1–50 mole percent concentration, based on the amount of oxazoline moiety present. Preferably, about 1–10 mole percent of acid is employed.

By polymers of these new oxazolines is meant their homopolymers and copolymers with vinyl monomers as previously defined, such copolymers containing at least 1% by weight of oxazoline.

EXAMPLES 18–23

The copolymers of Examples 12–17 were dissolved in benzene to make 20% by weight solutions. To each of these solutions there was added a quantity of boron trifluoride etherate equivalent to 5 mole percent of the oxazoline moiety present. Films were cast from these solutions on glass plates and dried at room temperature. The dry films were then baked in a circulating air oven at 100° C. and 150° C. The baked films were soaked in toluene and the amount of swelling of the films, i.e., the percent increase in thickness, was determined as an inverse measure of the degree of crosslinking present. For example, a relatively minor swelling indicated a high degree of crosslinking while increased amounts of swelling indicated correspondingly less crosslinking in the copolymer. Copolymers where essentially no cross-linking had taken place dissolved in the solvent. Results are listed in the table below:

| Copolymer | Percent swelling in toluene | | |
|---|---|---|---|
| | Baked at 100° C. | | Baked at 150° C., 30 min. |
| | 60 min. | 180 min. | |
| A | | | 0 |
| B | 73.7 | 50 | 42.9 |
| C | 45.8 | 40 | 1.8 |
| D | 25.0 | 3.9 | 2.4 |
| E | Dissolved | Dissolved | Dissolved |
| F | Dissolved | Dissolved | Dissolved |

Films were also cast from solutions of these copolymers to which no boron trifluoride had been added. After baking as above, all these films were soluble in toluene.

EXAMPLES 24–29

Similar experiments were carried out with other copolymers and with various concentrations of boron trifluoride. The films produced were baked 5 minutes at 150° C., then soaked in a solvent, and the amount of swelling was determined as before. Swelling solvents were toluene for styrene-2-vinyl-2-oxazoline copolymers (ST/VO) and acetone for methyl methacrylate-2-vinyl-2-oxazoline copolymers (MMA/VO). The ratios of monomers present in the copolymers are indicated in weight percent and the concentrations of boron trifluoride are given in mole percent based on the oxazoline moiety present in the polymer. Results are listed in the following table:

| Copolymer Composition | Ratio | Percent swelling at various BF₃ conc. | | | | | |
|---|---|---|---|---|---|---|---|
| | | 0% | 1% | 3% | 5% | 10% | 20% |
| ST/VO | 95/5 | d | | | | 37 | |
| ST/VO | 90/10 | d | 109 | 56 | 36 | 22 | 13 |
| ST/VO | 75/25 | d | | | | 0 | |
| MMA/VO | 98/2 | d | | | | 71 | |
| MMA/VO | 90/10 | d | 48 | 28 | 19 | 13 | 7 |
| MMA/VO | 75/25 | d | | | | 5 | | d—Dissolved.

Oxazoline copolymers which have been cross-linked as shown in the foregoing examples have utility as impregnants to impart crease-resistance to textile fabrics. Samples of unbleached muslin, after washing to remove sizing, were dipped in 5% benzene solutions of 3/1 by weight MMA/VO and ST/VO copolymers, to which solutions there had been added 5 mole percent based on the oxazoline content of boron trifluoride etherate. The excess liquid was squeezed from the cloth samples and they were dried under vacuum at 25° C. These cloths and an untreated control sample were creased, clamped between glass plates, and cured in an oven at 150° C. for 10 minutes. When cooled, all three samples had sharp creases.

These were then heated at 95° C. in aqueous detergent for 30 minutes. Upon rinsing and air drying, it was found that both treated samples still had prominent creases while the control sample was identical with the original cloth and no trace of a crease remained. Samples of the treated samples also retained their creases after 2 hours agitation in tetrachloroethylene.

A similar fabric experiment showed the difference in such an application between crosslinkable and non-crosslinkable alkenyloxazoline polymers. Pieces of washed and dried muslin were saturated, one with a 5% benzene solution of a 3/1 by weight methyl methacrylate-2-isopropenyl-2-oxazoline copolymer, and the other with a 5% benzene solution of a 3/1 by weight methyl methacrylate-4,5-dimethyl-2-vinyl-oxazoline copolymer, to each of which benzene solutions there had been added 5 mole percent based on the oxazoline content of boron trifluoride etherate. Excess solution was squeexed out of each cloth sample and the samples were dried under vacuum at 25° C. The dried pieces of cloth were creased, clamped between glass plates, and baked at 150° C. for 15 minutes. The thereby creased pieces of cloth were then shaken for a few minutes in tetrachlorethylene, vacuum dried at 25° C., stirred 1.5 hours in aqueous detergent at 95° C., rinsed, and air-dried. The sample of muslin treated with the methyl methacrylate-2-isopropenyl-2-oxazoline copolymer had a sharp and definite crease, the copolymer having been made insoluble and persistent by cross-linking. In contrast, the muslin treated with the 4,5-dimethyl-2-oxazoline copolymer which was essentially not crosslinked was limp and no sign of the original crease was visible.

Although polymers of operable alkenyloxazolines are effectively crosslinked to make infusible solvent and water resistant films by the action of strong acids as explained and shown above, these strong acids have certain disadvantages when used as such as crosslinking agents. For example, such acids exhibit some crosslinking activity even at low temperatures and oxazoline polymer compositions containing them tend to gel on standing and thereby become useless. This difficulty is overcome by employing a Lewis acid as previously specified as the salt of a volatile nitrogenous base. These salts effect crosslinking of the alkenyloxazoline polymers in the same way as the acids, but their action is delayed and is initiated only upon heating to about 100–200° C. Oxazoline polymer compositions containing these salts can consequently be stored for long periods without loss of properties due to slow gel formation. The salts are preferably those of ammonia. Quaternary ammonium salts of pyrroline, pyrrolidine, and lower aliphatic amines having about six or fewer carbon atoms in the molecule and a normal boiling point below about 100° C. may also be employed.

The polymers crosslinked by this procedure are those described above, that is, polymers containing at least 1% by weight of alkenyloxazoline. The quantity of ammonium salt required is about 2–50 mole percent of oxazoline moiety present, preferably 2–15 mole percent. The following examples illustrate this method of crosslinking.

EXAMPLE 30

A solution of the triethylamine salt or boron trifluoride was prepared by adding 14 g. of boron trifluoride etherate (48% $BF_3$) to 11 g. of triethylamine in 50 ml. of acetone with stirring and cooling. The resulting solution was diluted to 100 ml. with acetone.

A solution of 45 parts by weight of methyl methacrylate, 45 parts of butyl acrylate, and 10 parts of 2-vinyl-2-oxazoline in toluene was treated as in Examples 5–10 to effect copolymerization. To 10 g. of the 48% copolymer solution thereby obtained there was added 0.3 ml. of the boron trifluoride-triethylamine solution prepared above. A portion of this mixture was set aside to observe changes on aging and films were cast from the remainder. After drying at room temperature, the films were baked at 150° C. and the extent of swelling on soaking in toluene was determined at different baking times. Films baked for 30 minutes swelled only 20%, based on their original thickness. The same copolymer film containing no boron trifluoride salt swelled 130% after the same baking treatment.

EXAMPLE 31

To another 10 ml. of the copolymer solution employed in the previous example there was added 1.0 ml. of the $BF_3 \cdot Et_3N$ solution and the procedure of that example was repeated. After 19 minutes of baking at 150° C., film swelling in tolune was reduced to a minimum of 18%.

Samples of the copolymer —$BF_3 \cdot Et_3N$ solutions tested in this and the previous example were only slightly thickened and were still dilutable with toluene after storage for 2 months at room temperature.

EXAMPLE 32

A 32% solution of a 9/1 by weight copolymer of butyl acrylate and 2-vinyl-2-oxazoline in benzene was prepared by the method previously described. To 10 g. of this solution there was added 0.5 ml. of $BF_3$ etherate in toluene containing 0.7 g. millimole of $BF_3$ per ml. Films were cast from this solution, dried, and baked at 150° C. as before. After 30 minutes of baking, these films showed 20% swelling in toluene. A sample of the solution from which the films were cast was a solid gel after standing at room temperature for 3 days.

EXAMPLE 33

An emulsion of 10 g. of 2-vinyl-2-oxazoline, 40 g. of butadiene and 50 g. of styrene in 150 ml. of water containing in solution 1.5 g. sodium lauryl sulfate, 1.5 g. of potassium persulfate, and 0.75 g. of potassium carbonate was sealed in a reactor after flushing with nitrogen and heated at 70° C. while being agitated for 19 hours. The product was a latex containing 38.3% solids. To 50 g. of this latex there was added 6.54 g. of an aqueous solution of ammonium dodecylbenzenesulfonate containing 0.605 g. milliequivalents per gram. Films cast from this composition as before showed 30% swelling in toluene after 20 minutes' baking at 150° C. A sample of the latex containing the ammonium salt was aged 10 days at 60° C. A film cast from this aged latex and dried at room temperature swelled more than 100% in toluene, showing that little or no crosslinking had taken place during the aging process. Similarly, a film was cast from the original latex to which no ammonium salt had been added. After being baked at 150° C. for 30 minutes, this film swelled over 100% of its original thickness upon being soaked in toluene.

Polymers of alkenyloxazolines capable of being crosslinked as described can also be crosslinked and converted into infusible, water and solvent resistant polymers by reaction with a polycarboxylic acid.

Suitable polycarboxylic acids include acids such as sebacic acid, succinic acid, tricarballylic acid, citric acid, terephthalic acid, benzenetricarboxylic acid, and also polymers having plural carboxylic acid groups in the polymer molecule. This method of crosslinking comprises contacting a polymer containing alkenyloxazoline moieties of the type previously defined with a polycarboxylic acid, whereupon interaction and crosslinking of the polymer molecules takes place. For best results, an approximately equivalent molar proportion of oxazoline moiety to carboxyl group is employed. Heating the mixture accelerates the reaction but the reaction occurs at lower temperatures and crosslinking is obtained by allowing such a mixture to age at ambient temperature. The process is advantageous in that films having a very high degree of cure may be obtained at low temperatures and in relatively short baking times. The following examples are illustrative of ways in which the procces can be carried out.

EXAMPLES 34–39

Polymers designated in Examples 12–17 as polymers A, B, C, D, E, and F were dissolved in benzene to make 20% by weight polymer solutions. To each of these solutions there was added sufficient of a polylinoleic acid of the approximate composition 75% dimer, 24% trimer, and 1% monomer so that there was present in the mixture about one oxazoline moiety to one carboxyl group. Films were cast from the resulting solutions and air-dried before being baked in a circulating air oven at 100° C. and at 150° C. The degree of swelling of the baked films in toluene was then measured as an indication of the amount of crosslinking which had taken place. Results are listed below.

| Copolymer | Percent swelling in toluene | |
|---|---|---|
| | 180 min. at 100° C. | 30 min. at 150° C. |
| A | | 20 |
| B | 44.8 | 35.3 |
| C | 44.4 | 40 |
| D | 26.1 | 20 |
| E | Dissolved | Dissolved |
| F | Dissolved | Dissolved |

All the above experiments were paralleled with films containing no polylinoleic acid. All such control films dissolved in toluene.

EXAMPLE 40

A polymerization bottle was partially filled with a solution of 45 g. of butyl acrylate, 5 g. of 2-vinyl-2-oxazoline, and 0.2 g. of azobisisobutyronitrile in 100 g. of benzene. The bottle was flushed with nitrogen, sealed, and agitated at 70° C. for 12 hours. The product was a clear, viscous solution which contained 32.1% by weight of non-volatiles. To 10 g. of this polymer solution (3.3 g. milliequivalents of oxazoline moiety) there was added 12.7 g. (3.4 g. meq. of carboxyl group) of a 25% solution in toluene of a 92.3%–7.7% by weight styrene-acrylic acid copolymer. Films were cast from this mixture on glass plates and the air-dried films were baked at 150° C. After baking for 30 minutes, the films showed about 40% swelling when soaked in toluene, indicating that a considerable amount of crosslinking of the polymer had taken place.

We claim:

1. A process for making a compound of the formula

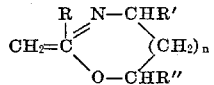

wherein R is selected from the group consisting of hydrogen and methyl, R' and R" are selected from the group consisting of hydrogen and primary and secondary alkyl radicals of one to about sixteen carbon atoms, and $n$ is an integer from zero to one inclusive, which process comprises reacting by contacting one mole of an imidoester having the structure

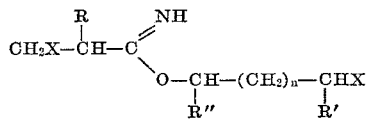

wherein R, R', R", and $n$ are as defined above and X is halogen of atomic number from 17 to 35, with about 2 to about 4 molar equivalents of a strong base at a temperature of about 0–100° C. for a time sufficient to effect substantial reaction and separating the product from the reaction mixture thereby formed.

2. The process of claim 1 wherein the product is separated by distillation from the reaction mixture in the presence of about 0.5% to about 3% by weight based on the product of a trialkyl amine having a boiling point substantially higher than that of the product.

3. A process for making a compound of the formula

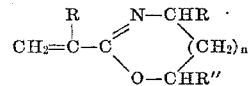

wherein R is selected from the group consisting of hydrogen and methyl, R' and R" are selected from the group consisting of hydrogen and primary and secondary alkyl radicals of one to about sixteen carbon atoms, and $n$ is an integer from zero to one inclusive, which process comprises reacting by contacting one mole of an imidoester hydrohalide of the formula

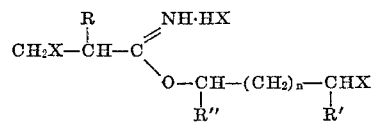

wherein R, R', R", and $n$ are as defined above and X is halogen of atomic number from 17 to 35, with from about three to about five moles of a lower alkyl tertiary amine in about 0.5–1.5 liters of methylene chloride per gram mole of imidoester hydrohalide at 0–100° C. for 0.1–15 hours and separating the product compound from the reaction mixture thereby formed.

4. A process for making a compound of the formula

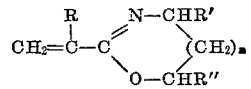

wherein R is selected from the group consisting of hydrogen and methyl, R' and R" are selected from the group consisting of hydrogen and primary and secondary alkyl radicals of one to about sixteen carbon atoms, and $n$ is an integer from zero to one inclusive, which process comprises reacting by contacting approximately equimolar proportions of (1) a compound selected from the group consisting of acrylonitrile and methacrylonitrile and (2) a compound of the formula

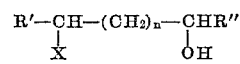

R', R", and $n$ defined as above and X is halogen of atomic number from 17 to 35, with about two to about four moles of HX at about 0–25° C., removing from the essentially completely reacted mixture substantially all the unreacted hydrogen halide, contacting the mixture thereby obtained with from about three to about five moles of lower alkyl tertiary amine per mole of starting nitrile in methylene chloride solution at 30–60° C. for 2–8 hours and separating the product compound from the reaction mixture thereby formed.

5. An infusible solid crosslinked vinyl polymer of a compound of the formula

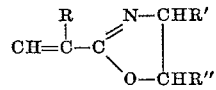

wherein R is selected from the group consisting of hydrogen and methyl, and R' and R" are selected from the group consisting of hydrogen and primary and secondary alkyl radicals of one to about sixteen carbon atoms, at least one of R' and R" being hydrogen, wherein the crosslinking is through opening of the oxazoline ring.

6. An infusible solid crosslinked vinyl polymer of 2-vinyl-2-oxazoline wherein the crosslinking is through opening of the oxazoline ring.

7. A process which comprises contacting a thermoplastic solid polymer of a compound of the formula

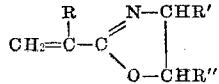

wherein R is selected from the group consisting of hydrogen and methyl, and R' and R'' are selected from the group consisting of hydrogen and primary and secondary alkyl radicals of one to about sixteen carbon atoms, at least one of R' and R'' being hydrogen, with about 1–50 mole percent based on the content of said compound in said polymer of a Lewis acid, for a time sufficient to cause substantial crosslinking of said polymer through opening of the oxazoline ring.

8. The process of claim 7 wherein the Lewis acid is $BF_3$.

9. A process which comprises contacting a thermoplastic solid polymer of a compound of the formula

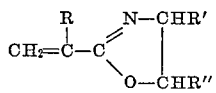

wherein R is selected from the group consisting of hydrogen and methyl, and R' and R'' are selected from the group consisting of hydrogen and primary and secondary alkyl radicals of one to about sixteen carbon atoms, at least one of R' and R'' being hydrogen, at about 100–200° C. with about 2–50 mole percent based on the content of said compound in said polymer of a salt of a Lewis acid with a base selected from the group consisting of ammonia and amines having a normal boiling point below about 100° C. for a time sufficient to cause substantial crosslinking of said polymer through opening of the oxazoline ring.

10. A process which comprises contacting a thermoplastic solid polymer of a compound of the formula

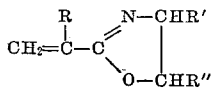

wherein R is selected from the group consisting of hydrogen and methyl, and R' and R'' are selected from the group consisting of hydrogen and primary and secondary alkyl radicals of one to about sixteen carbon atoms, at least one of R' and R'' being hydrogen, with a polycarboxylic acid at at least ambient temperature for a time sufficient to cause substantial crosslinking of said polymer through opening of the oxazoline ring.

11. The process of claim 10 wherein the polycarboxylic acid is employed in a proportion such that about one mole of carboxyl group is present per mole of said compound as contained in said polymer.

References Cited

UNITED STATES PATENTS

| | | | |
|---|---|---|---|
| 2,442,582 | 6/1948 | Bishop | 260—307 |
| 2,897,182 | 7/1959 | De Benneville et al. | 280—80.3 |
| 2,968,657 | 1/1961 | Perry et al. | 260—86.1 |
| 3,108,114 | 10/1963 | Krespan | 206—307 |
| 3,151,129 | 9/1964 | Leumann et al. | 260—47 |

OTHER REFERENCES

Elderfield, Heterocyclic Compounds, vol. 5, pp. 382–383. New York: John Wiley (1957).

JAMES A. SEIDLECK, Primary Examiner

J. C. HAIGHT, Assistant Examiner

U.S. Cl. X.R.

260—80.72, 88.1, 88.3, 96, 244, 307